July 7, 1925.  1,544,755
G. R. HOFFMAN
TRANSMISSION BAND FOR AUTOMOBILES, MOTOR VEHICLES, AND OTHER PURPOSES
Filed March 12, 1923  3 Sheets-Sheet 1
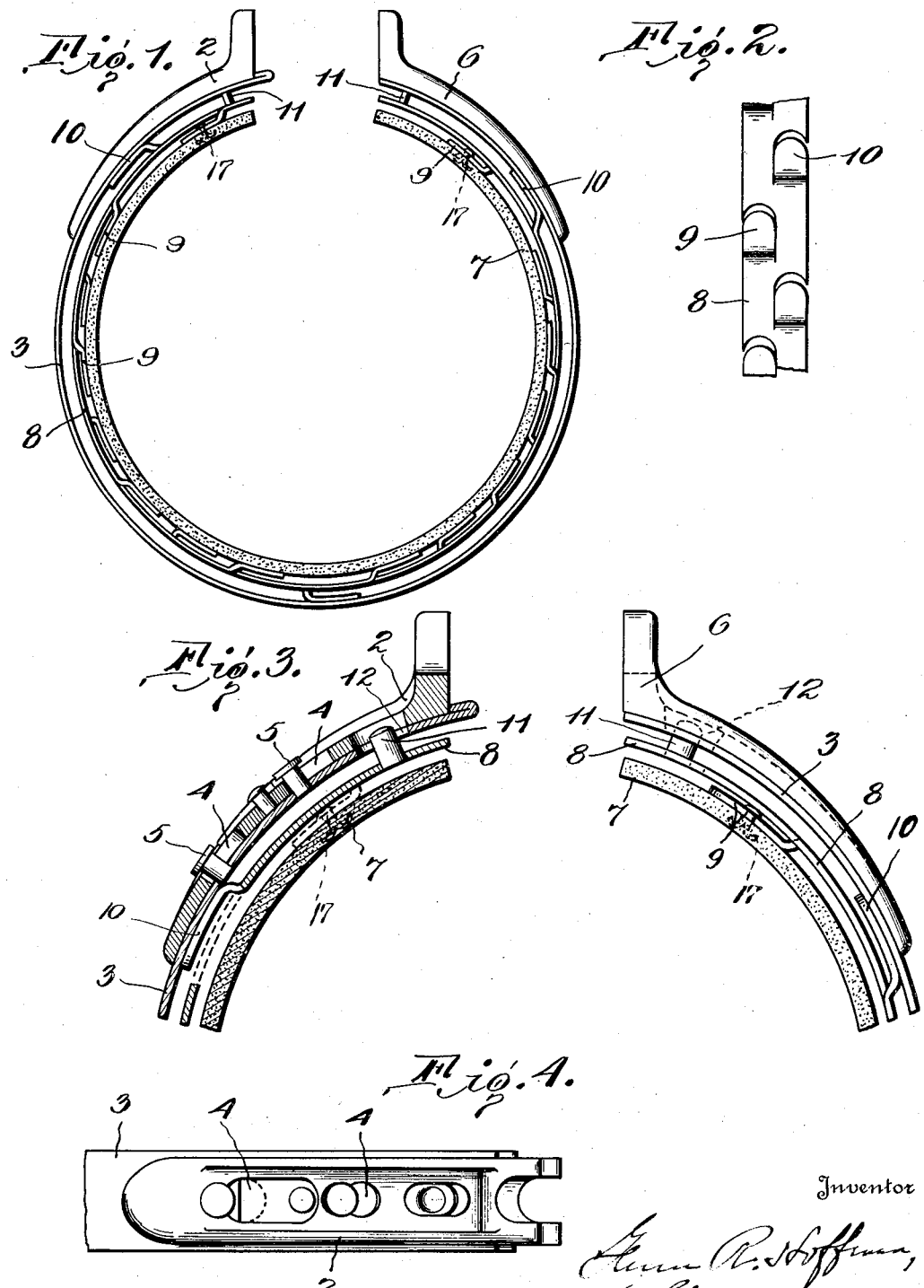

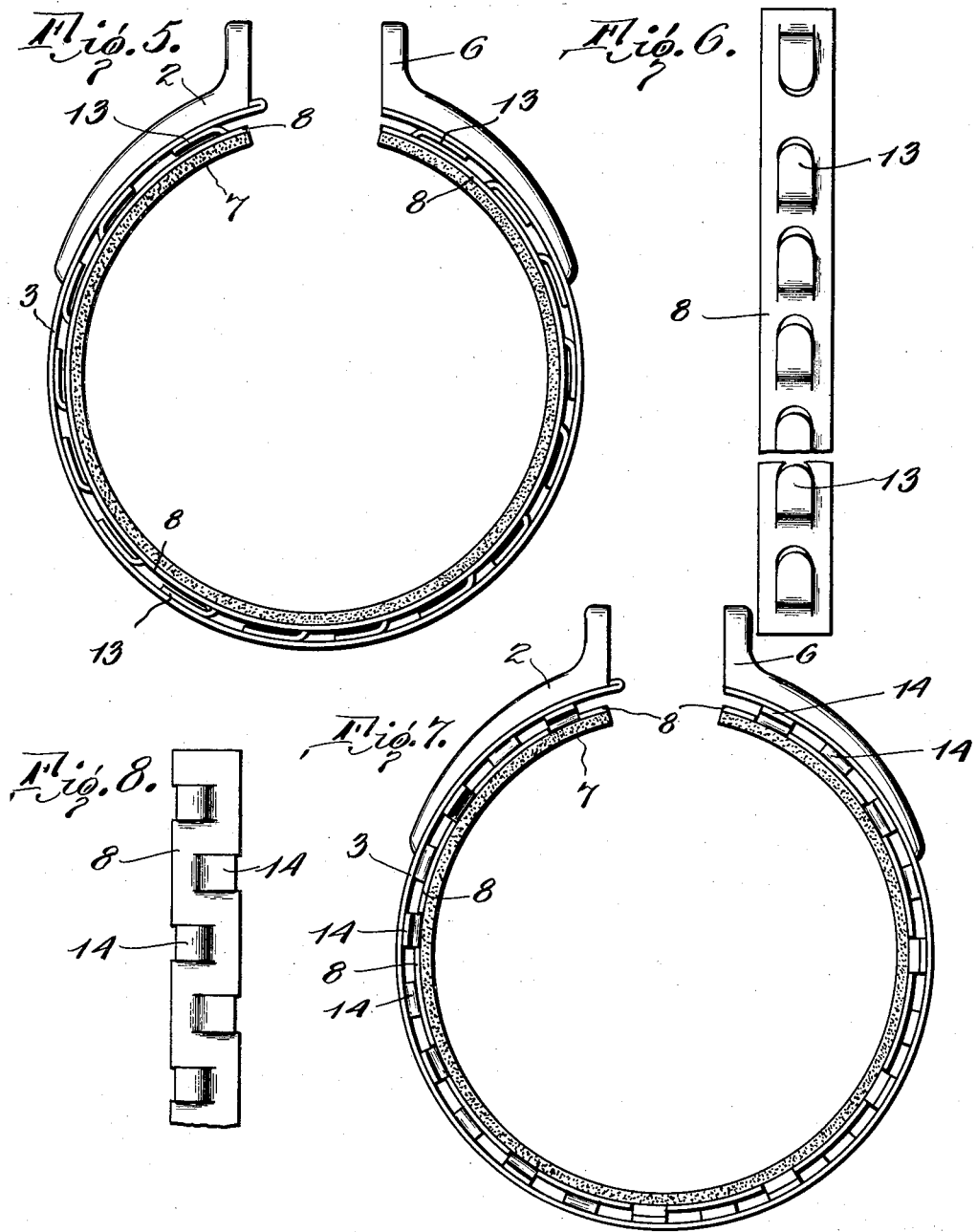

July 7, 1925.
G. R. HOFFMAN
1,544,755
TRANSMISSION BAND FOR AUTOMOBILES, MOTOR VEHICLES, AND OTHER PURPOSES
Filed March 12, 1923      3 Sheets-Sheet 3
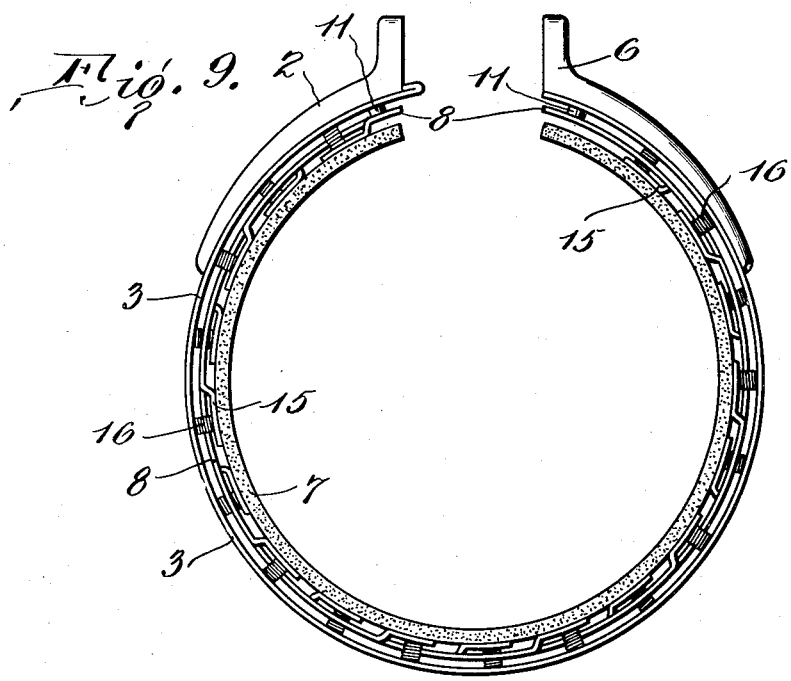
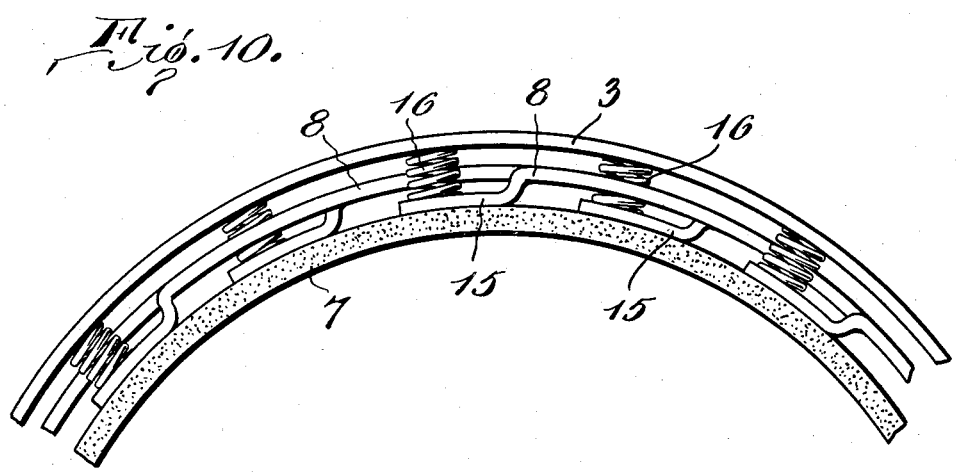

Patented July 7, 1925.

1,544,755

UNITED STATES PATENT OFFICE.

GLENN R. HOFFMAN, OF SPRINGFIELD, ILLINOIS, ASSIGNOR TO HOFFMAN MANUFACTURING COMPANY, OF SPRINGFIELD, ILLINOIS, A CORPORATION OF ILLINOIS.

TRANSMISSION BAND FOR AUTOMOBILES, MOTOR VEHICLES, AND OTHER PURPOSES.

Application filed March 12, 1923. Serial No. 624,430.

*To all whom it may concern:*

Be it known that I, GLENN R. HOFFMAN, a citizen of the United States, residing at Springfield, in the county of Sangamon and State of Illinois, have invented certain new and useful Improvements in Transmission Bands for Automobiles, Motor Vehicles, and Other Purposes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to transmission bands intended more particularly for use on transmission drums of automobiles, motor trucks and like vehicles, although not limited to such particular uses. It has for its object to provide a transmission band having greater resiliency than the usual construction and which results in an easier and more gradual application of frictional contact between it and the transmission drum than is ordinarily the case and which also will tend to prolong the wearing qualities or durability of the lining to the band.

To the accomplishment of the foregoing and such other objects as may hereinafter appear the invention consists in the features hereinafter described and then sought to be clearly defined by the claims, reference being had to the accompanying drawings forming a part hereof, and in which Figure 1 is a side elevation of one form of the transmission band;

Figure 2 a plan view of a portion of the resilient strip or strap placed between the outer strap of the band and lining;

Figure 3 is a vertical section through the band, on an enlarged scale, portion of the band being broken away;

Figure 4 is a plan view of the removable ear of the band;

Figure 5 is a side view of a modified form of the band;

Figure 6 is a plan view of the modified resilient strap between the outer strap and lining of the band, a portion being broken away;

Figure 7 is a side view of another modification of band;

Figure 8 a plan view of a portion of the modified strap between the outer strap and lining;

Figure 9 a side view of another modification;

Figure 10 a side view of the modified form, on an enlarged scale, a portion of the band being broken away.

In the drawings the numeral 3 designates the outer metallic strap of the band which has removably attached to one end the removable ear 2 formed with slots having enlarged ends 4 for the reception of headed studs 5 projecting from the outer metal strap 3 to permit the ear to slide longitudinally in applying and removing the ear from the band, the enlarged heads of the studs holding the ear to the band when in the reduced ends of the slots and permitting the removal of the ear when the headed studs are in register with the enlargements of the slots. The end of the strap 3 next to the notched end of the ear is shown as bent upward and backward to form an abutment against which the end of the ear will bear when attached to the band. The other end of the band will have an ear 6 attached thereto by rivets or otherwise to effect a permanent attachment of the ear as usual in transmission bands. The numeral 7 designates the lining to the band formed as usual of woven fabric or other suitable material.

Between the outer metal strap 3 and the lining 7, I place a strap 8 which is formed with struck-up lips or prongs 9 and 10, some of which project from the inner face of the strap and lie parallel therewith while others project from the outer face and lie parallel therewith, the strap with its projecting lips serving as an elastic cushion between the outer strap and the lining so that resiliency, more or less, is given to the transmission band, and thereby an easy gradual and yet prompt frictional engagement between the band and its drum is effected when compression is applied, say through the usual foot pedal shaft employed in the Ford type of transmission, and sudden shock or jerking action prevented in the frictional engagement of the brake band with its drum. The lining 7 of the band may be attached or fastened to the lips in engagement therewith in any suitable manner, for instance by rivets as indicated at 17, in the manner commonly practiced for securing transmission-band linings in place; and the strap 8 may be provided at opposite ends with projecting studs or pins 11 to enter corresponding slots or openings 12 formed in the ears 2 and 6 so as to prevent or restrict longitudinal as well as lateral movement of the strap relatively to the outer metal strap and the ears.

In the modified form illustrated in Figures 5 and 6 of the drawing the same elements and substantially the same features of construction as in the form shown in Figures 1 to 4 will be employed except that the intermediate strap 8 will have the resilient lips 13 project only from the side or face of the strap next to or facing the outer metal strap 3 in tandem formation instead of staggered formation as in Figs. 1 to 3, and the lips at the end of the strap will each extend inwardly, or in other words in the direction away from the ends as illustrated in Figs. 5 and 6 of the drawings. In this form the intermediate strap has its inner face in direct contact with the lining 7 and its outer face spaced from the outer strap 3 by the resilient lips as illustrated.

In the form illustrated in Figs. 7 and 8 the same elements are employed as in the forms previously described, except that the resilient lips 14 of the intermediate strap are struck-up from opposite edges of the strap, and in staggered formation as illustrated, so that they will bear at corresponding points against the inner surface or face of the outer strap 3 as clearly indicated in Fig. 7 of the drawing and the inner face of the strap will bear directly against the lining as indicated in the same figure of the drawing.

In the modification illustrated in Figures 9 and 10 of the drawing the elements will be substantially the same as in Figures 1 to 3, and the intermediate strap 8 will have the resilient lips 15 struck-up so as to project from the same face of the strap, and in staggered formation, as illustrated in Figs. 9 and 10. In this modification, however, coil springs 16 are employed in addition to the resilient lips. These springs pass through the openings left by the struck-up lips 16, and bear at one end against the inner face of the outer strap 3 and at their inner ends against the resilient lips as clearly illustrated in Figure 10 of the drawing. In this form the resiliency of the lips will be supplemented by the resiliency of the coil springs. While the resiliency of the lips and the coil springs may be sufficient to hold the several parts in their relation to one another but if desired any suitable means suggesting itself to the skilled mechanic, such as studs or pins, may be used to further insure the nonseparation or slipping of the parts.

It will be observed from the foregoing that in each form an intermediate strap between the outer or facing strap of the band and the lining is used having resilient lips or fingers which serve to give an additional elasticity or cushioning effect to the transmission band for the purposes before mentioned, and that if desired the lips or fingers may be supplemented by the resiliency afforded by the coil springs. While I have illustrated and described with particularity the preferred details of construction of the several parts it is obvious that changes may be made therein and essential features of the invention be retained.

Having described my invention and set forth its merits what I claim is:

1. A transmission band comprising an outer metal circularly disposed strap, a lining for the band, and a circularly disposed metal strap formed with projecting resilient lips interposed between the outer strap and lining.

2. A transmission band comprising an outer metal circularly disposed strap, a lining for the band, and a circularly disposed metal strap formed with projecting resilient lips extending from opposite faces of the strap and interposed between the outer strap and lining.

3. A transmission band comprising an outer metal circularly disposed strap, a lining for the band, and a circularly disposed metal strap formed with projecting resilient lips arranged in staggered formation relatively to one another and interposed between the outer metal strap and the lining.

4. A transmission band comprising an outer metal circularly disposed strap, a lining for the band, a circularly disposed metal strap formed with projecting resilient lips and interposed between the outer strap and lining, and coil springs interposed between the outer strap and the lining.

In testimony whereof I affix my signature in presence of two witnesses.

GLENN R. HOFFMAN.

Witnesses:
Roy B. McKown,
David H. Paulding.